(12) United States Patent
DeHaas et al.

(10) Patent No.: US 8,671,192 B2
(45) Date of Patent: *Mar. 11, 2014

(54) INTERNET USE MONITORING SYSTEM

(75) Inventors: Ronald J. DeHaas, Owosso, MI (US); Scott D Hammersley, Corunna, MI (US); Collin J Rose, Corunna, MI (US)

(73) Assignee: RCS Dynamics, LLC, Owosso, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,947

(22) Filed: Aug. 3, 2012

(65) Prior Publication Data

US 2012/0303803 A1    Nov. 29, 2012

Related U.S. Application Data

(63) Continuation of application No. 10/605,886, filed on Nov. 4, 2003, now Pat. No. 8,255,514.

(51) Int. Cl.
*G06F 15/173* (2006.01)
(52) U.S. Cl.
USPC .......................................... 709/224; 715/744
(58) Field of Classification Search
None
See application file for complete search history.

(56) References Cited

U.S. PATENT DOCUMENTS

| | | | |
|---|---|---|---|
| 5,727,129 A | 3/1998 | Barrett et al. |
| 5,951,642 A | 9/1999 | Onoe et al. |
| 5,991,807 A | 11/1999 | Schmidt et al. |
| 6,052,730 A | 4/2000 | Felciano et al. |
| 6,230,204 B1 | 5/2001 | Fleming |
| 6,397,256 B1 | 5/2002 | Chan et al. |
| 6,415,322 B1 | 7/2002 | Jaye |
| 6,442,529 B1 | 8/2002 | Krishan et al. |
| 6,442,590 B1 | 8/2002 | Inala et al. |
| 6,449,604 B1 | 9/2002 | Hansen et al. |
| 6,513,060 B1 | 1/2003 | Nixon et al. |
| 6,515,968 B1 | 2/2003 | Combar et al. |
| 6,606,657 B1 | 8/2003 | Zilberstein et al. |
| 6,651,099 B1 | 11/2003 | Dietz et al. |
| 6,681,247 B1 | 1/2004 | Payton |
| 6,795,856 B1 | 9/2004 | Bunch |
| 6,912,505 B2 | 6/2005 | Linden et al. |
| 6,957,390 B2 | 10/2005 | Tamir et al. |
| 7,043,497 B1 | 5/2006 | Carty et al. |
| 7,080,139 B1 | 7/2006 | Briggs et al. |
| 7,143,159 B1 | 11/2006 | Grace et al. |
| 7,181,412 B1 | 2/2007 | Fulgoni et al. |
| 7,299,457 B2 | 11/2007 | Marshall |
| 7,502,797 B2 | 3/2009 | Schran et al. |
| 7,631,032 B1 | 12/2009 | Refuah et al. |
| 7,634,423 B2 | 12/2009 | Brocklebank |
| 7,739,281 B2 | 6/2010 | Najork |
| 2002/0111887 A1 | 8/2002 | McFarlane et al. |
| 2003/0130979 A1 | 7/2003 | Matz et al. |
| 2004/0019061 A1 | 1/2004 | Smith et al. |
| 2004/0139192 A1 | 7/2004 | Spaid |
| 2004/0158630 A1 | 8/2004 | Chang et al. |

*Primary Examiner* — Dustin Nguyen
(74) *Attorney, Agent, or Firm* — Fitch Even Tabin & Flannery LLP

(57) ABSTRACT

A system for monitoring Internet use of a selected computer user includes a remote server and a computer having a monitoring program voluntarily installed thereon by the user communicatively connected to the remote server. The monitoring program is configured to monitor various Internet access activity of the computer user and record the Internet access activity on the remote server. The Internet access activity includes access of at least one Internet protocol from the group consisting of newsgroups, file sharing programs, file transfer programs, chat rooms, peer to peer chats, and electronic mail activity. A method of using a monitoring system includes the steps of a computer user voluntarily installing a monitoring program on a selected computer, recording the Internet access activity, and providing the recorded information to a third party recipient. A report may be provided that includes a variety of information and may include a plurality of portions.

7 Claims, 3 Drawing Sheets

INTERNET USE MONITORING SYSTEM

This application is a continuation of U.S. application Ser. No. 10/605,886, now U.S. Pat. No. 8,255,514, filed on Nov. 4, 2003, which are hereby incorporated herein by reference in their entirety for all purposes.

BACKGROUND OF INVENTION

1. Field of the Invention

The present invention generally relates to a computer program for monitoring select Internet activities of a user of a selected computer to which the program is installed, and more particularly to a voluntary monitoring program configured to monitor multiple Internet access activities, such as web browsing, file sharing programs, news groups, chat rooms, peer to peer chats, file transfer protocols, e-mails sent and received, and the like.

2. Discussion of the Prior Art

Although it would be desirable or even necessary to block access to objectionable material from some users in web sites and the like, this is often not possible as a practical matter. Such blocking may either compulsorily or voluntarily monitor the usage of a selected computer or in some case televisions and compile a record of the web sites or channels accessed by that particular user. This record could be made available to select third party recipients automatically and at pre-determined time intervals, or access to the record may be provided to the selected third party recipient.

For example, US patent application 2003/0130979 to Matz, et al. describes a system having a content-access-history database that includes information about actions the subscriber has taken to access certain types of content, such as television programming and the like on web sites. Although one of the embodiments of this invention states that providers may use the system for monitoring the internet, it does not describe how the system could be adapted for such use and mainly describes the use as applied to televisions.

Site specific internet usage monitoring programs are also generally known in the art. Such monitoring programs may be installed by employers or parents to monitor the web sites visited by employees or children respectively. It may also be desirable to monitor web sites accessed by other persons under a variety of different circumstances. Involuntary applications of these types of programs are often used by employers. The employee has no choice but to accept the monitoring activity on the computer since they have no expectation of privacy for business owned systems. In a voluntary monitoring system, the user knowingly and voluntarily has the monitoring program installed on a particular computer to monitor his internet activities. The user may even select one or more third party recipients to receive, or have access to a report containing a record of the internet activity of the computer user.

For example, U.S. Pat. No. 6,606,657 to Zilbertstein, et al., describes a system to gather and report detailed information on a user's web site visitation. Here, a server system is connected to the internet and receives, processes and supplies detailed user information such as the sites visited and the duration and times of such visits. Such information is gathered and transmitted to subscribers who have reporting and communicating software installed. In addition, the users submit profile information about themselves. Demographic information as to the popularity of visited web sites may then be easily determined, stored and updated by the server. This demographic information, in turn, may be provided to other users, or web site operators and advertisers. The invention disclosed also allows users to initiate chat sessions with other users visiting a particular web site, or post a virtual note on the site for other subscribers to read. A disadvantage to this invention is that most of the web monitoring information is provided to the website owners and operators not the users.

U.S. Pat. No. 6,449,604 to Hansen, et al. describes a system for displaying information on the Web page usage. Statistical information and usage analysis produced by this invention is available to owners and web-site operators. A disadvantage to this invention is that it focuses on website use, not a user's usage. U.S. Pat. No. 6,052,730 to Feliciano, et al. discloses a method for monitoring web browsing activities that does not require modification or reconfiguration of client software, and does not require information from other servers. Complete tracking of a client browsing session is allowed, including detailed link usage, page visits, and the sequence in which the accessing took place. The invention also allows such tracking information to be generated and recorded through the use of a single server. The disadvantage to this invention is that the method is transparent to the client browser.

U.S. Pat. No. 6,397,256 to Chan, et al. describes a device for transmitting browser activity to a monitoring unit. The monitoring unit is remotely located from the Internet access unit and coupled to the transmission device, the monitoring unit including a display for viewing, and recording Internet activity of the Internet access unit. The system may be activated via a remote command module and may include a password protected interface on the Internet browser (via the software plug-in). Unfortunately, this system is fairly complicated in that it requires an installed transmission adapter card.

While the voluntary programs currently available in the art are configured to monitor web sites accessed by the computer user, they do not offer the capability to monitor the activities resulting from use of other protocols, such as access to file share programs, news groups, chat rooms, peer to peer chats, file transfer protocols, and e-mails. Without these capabilities a user may circumvent a monitoring program by accessing unmonitored internet protocols.

Although there is known in the art various means to monitor computer use, there is a desire and need in the art to provide a computer use monitoring program capable of monitoring and recording a variety of internet activities of a particular computer user including web browsing activity, file share programs use, news group access, chat room activity, peer to peer chat activities, file transfer protocol use, e-mails sent and received, and the like. This monitoring could then be recorded and made available to not only the user, but also to a third party recipient. There is a further need to provide an internet monitoring program capable of generating and providing a report having information related to the above described internet activities.

SUMMARY OF INVENTION

Accordingly, the present invention provides an Internet monitoring system and method configured to monitor and record Internet activities of a particular computer user including web browsing activity, file sharing program access, news group access, chat room activity, peer to peer chat activity, file transfer protocol access, and e-mails sent and received. Current voluntary monitoring programs available in the art are limited to monitoring and reporting on web browsing activities. The system and method of the present invention also records and makes available this monitoring activity to a designated third party recipient. The reports may further include a link connecting reported information related to these different protocols.

In one embodiment of the present invention, a system for monitoring Internet use of a selected computer user includes a remote server and a computer communicatively connected to the remote server and having a monitoring program installed thereon by the computer user. The monitoring program is configured to monitor Internet access activity of the computer user and record the Internet access activity on the remote server. The Internet access activity includes at least one Internet protocol from the group consisting of network news transfer protocols, file sharing programs, file transfer protocols, chat room access, peer to peer chat access and electronic mail activity.

In another embodiment of the present invention, a method of monitoring Internet use of a selected computer user includes the steps of: a user voluntarily installing a monitoring program on the computer, the program configured to monitor Internet access activity of the user, the Internet access activity including at least one Internet protocol from the group consisting of newsgroup access, file sharing programs, file transfer protocols, chat room activity, peer to peer chat activity and electronic mail activity; monitoring the Internet access activity; and recording the Internet access activity on a first database located within a remote server.

In yet another embodiment of the present invention, a system for reporting Internet access activity of a selected computer user includes a remote server and a computer communicatively connected to the remote server having a monitoring program installed thereon. The monitoring program is configured to monitor Internet access activity of the computer user and record the activity on the remote server. The Internet access activity includes access to at least one Internet protocol from the group consisting of hyper text transfer protocol, network news transfer protocol, file sharing programs, file transfer protocol, chat rooms, peer to peer chats, and electronic mail. The remote server is further configured to generate a report including a plurality of portions, and each portion containing a list of the recorded Internet access activity of one of the Internet protocols. The portions may further include a computer link to connect to another of the plurality of portions.

In still another embodiment of the present invention a method of reporting Internet use of a selected computer user includes the steps of: a user voluntarily installing an Internet monitoring program on the computer, the program being configured to monitor Internet access activity of the user; monitoring the Internet access activity; generating a report of the Internet access activity, the report including a plurality of portions; and providing a link on one portion of the report to electronically connect to at least one other portion of the report, wherein each of the plurality of portions contain information on Internet access of different Internet protocols.

Other features of the present invention will become more apparent to persons having ordinary skill in the art to which the present invention pertains from the following description and claims taken in conjunction with the accompanying figures.

BRIEF DESCRIPTION OF DRAWINGS

The foregoing features, as well as other features, will become apparent with reference to the description and figures below, in which like numerals represent like elements, and in which.

DETAILED DESCRIPTION

In general, the present invention can be realized as methods or systems in hardware, software, or a combination of hardware and software of a computer system including a computer network system. The present invention can be realized in a centralized fashion in one computer system or in a distributed fashion where different elements are spread across several computer systems. Any kind of computer system, or other apparatus adapted for carrying out the methods described herein, is suited. A typical combination of hardware and software may include a general purpose computer system with a computer program that, when being loaded and executed, controls the computer system such that it carries out the systems and methods described herein. The present invention may also be voluntarily embedded in a computer program product (or any computer useable medium having computer readable program code embodied therein), which comprises all the features enabling the implementation of the methods and systems described herein and which when loaded in a computer system is able to carry out these systems and methods.

Computer program or computer program product in the present context means any expression, in any language, code or notation, of a set of instructions intended to cause a system having an information processing capability to perform a particular function either directly or after either or both of the following: (a) conversion to another language, code or notation, and (b) reproduction in a different material or electronic form.

The present invention specifically relates to a voluntary Internet monitoring system and method for monitoring and recording Internet use of a particular computer user including web browsing activity, file sharing program access, news group access, chat room activity, file transfer programs access, e-mails sent and received, and the like, and providing a report to a third party recipient. This type of monitoring, when voluntarily initiated, may provide a user a method to minimize temptations to engage in Internet access activities considered objectionable to the user. If the user knows a third party recipient will have access to a report of his Internet access activity, thus eliminating the secrecy of the activity, he may refrain from such activity.

The present invention also provides reporting features superior to existing monitoring programs thus enhancing its usefulness and effectiveness. The report generated in the present invention is capable of reporting the Internet access activity of the user and may also provide a link on one portion of the report to allow the user to computer-link to and access information related to different Internet protocol activities on different portions of the report.

Figure 1:
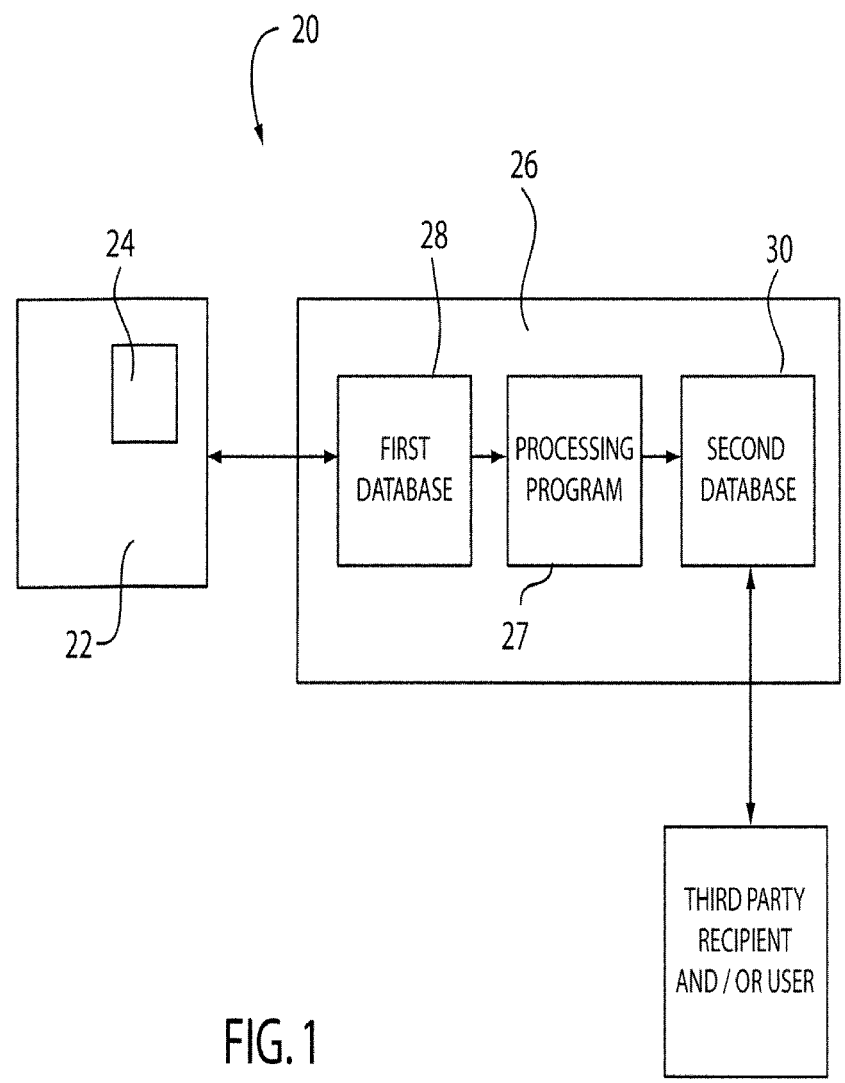
FIG. 1 is a schematic of a monitoring system of the present invention.

Turning to FIG. 1, a monitoring system 20 of the present invention provides a system of monitoring the Internet access activity of a computer user and includes a selected computer 22 onto which a monitoring program 24 may be installed. The user may voluntarily elect to have the monitoring program 24 installed on his computer to monitor his own Internet access activities. The "user" as used in this application refers to the computer user to be monitored who has voluntarily chosen to install the monitoring program 24. The system allows selection of one or more third party recipient who will receive reports, or have access to reports, of the Internet access activity of the user.

The monitoring program 24 may be installed by downloading the program directly from a remote server 26 through an Internet connection or other suitable means, or may alternatively be installed manually by way of a prerecorded media, such as a compact disc (CD). Before installing the monitoring program 24, the user may make certain pre-installation elections such as who will be the recipient of information gathered with the monitoring program 24, how often reports will be updated and made available to either the user or a third party recipient, as well as other key parameters that will be discussed in more detail below.

Once the monitoring program 24 has been installed on computer 22, computer 22 is communicatively connected to server 26 through an electronic connection, such as telephone lines, cable, fiber optics, electric power lines, or other suitable connection. When the user attempts to connect to the Internet, the user will be unable to gain access to the Internet without first establishing a connection with remote server 26. During or after the initial installation of monitoring program 24, the user may elect to have an automatic connection to remote server 26 and thus, the Internet, or may have a prompt display on the screen of computer 22 indicating that a password is required to enter the Internet. This password would then connect computer 22 to remote server 26. Remote server 26 may include any personal computer or other hardware system available and known in the art. Server 26 may be a single server or include a "server cluster" containing multiple servers.

When monitoring program 24 is installed on computer 22, during any given session of Internet access all Internet access activity of the user will be recorded by the monitoring program 24 onto the remote server 26. These activities may include the traditional web site protocols, such as hyper text transfer protocol (http) (i.e., web browsing activities), in addition to other protocols not presently able to be monitored by existing monitoring programs. These other protocols may include protocols used in file sharing programs (gnutella, fast track and other like programs), news group access or network news transfer protocol (nntp), chat room activity and peer to peer chats, file transfer protocols (ftp), and protocols for reading e-mail such as post office protocol 3 (pop3) and Internet message access protocol (IMAP), and protocols for writing or sending emails such as simple mail transfer protocol (smtp). As other new protocols are developed, the system may be reconfigured to add monitoring and reporting capabilities for those as well. These may be added as program updates, new releases and the like. The Internet access activity being monitored may be routed over the Internet, compiled then stored in remote server 26 or in a database contained within remote server 26.

Figure 2:
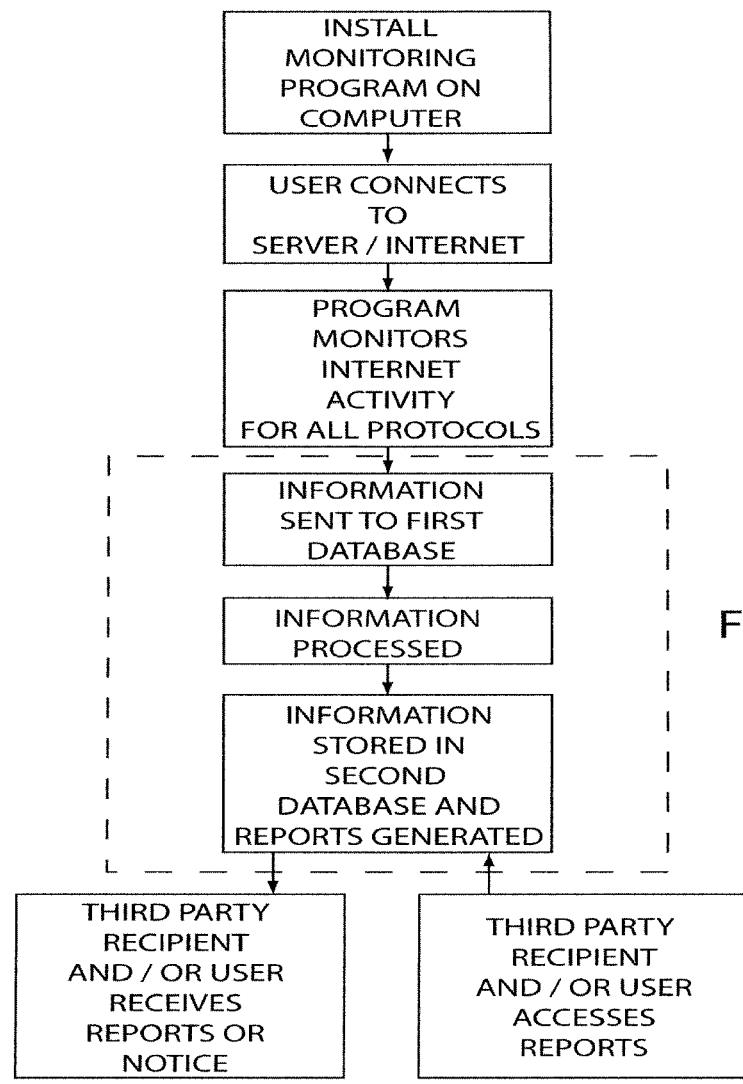
FIG. 2 is a schematic of a method of monitoring and reporting of the present invention.
Figure 3:
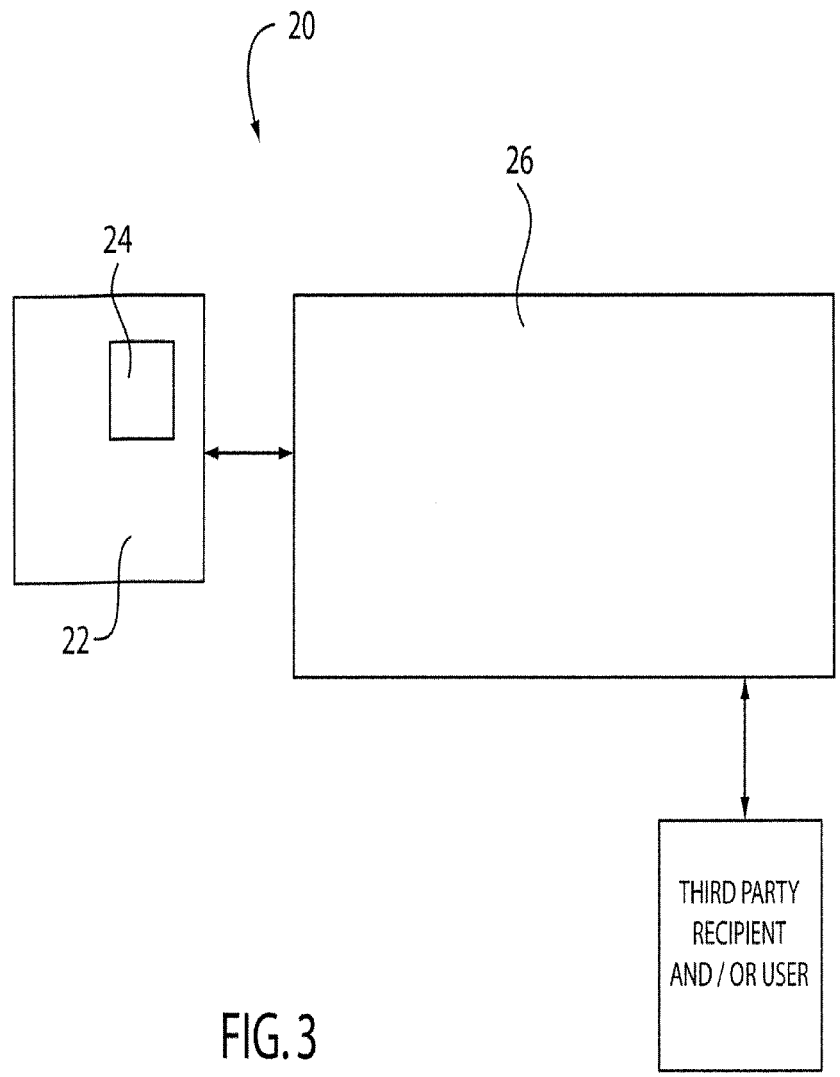
FIG. 3 is a schematic of one embodiment of a monitoring system of the present invention.

In one embodiment of the present invention as shown in FIGS. 1 and 2, remote server 26 may include a first database 28 wherein the compiled information is stored in a temporary file designated for the particular user. Periodically, this information may be routed through a processing program 27 and transferred to an optional second database 30, which may also reside within remote server 26. Although this embodiment describes the use of two separate databases for storing the recorded activity, it is to be understood, that the information may remain solely within a single database and be processed and saved in that database. Alternatively, the system may function without a designated database and perform the storing and processing of the data within remote server 26 as shown in FIG. 3.

The information processing performed by processing program 27 may include sorting the access activity of the user, assembling a list of the Internet access activity, and assigning a score to each activity listed. In one scenario, the score may be assigned as a numeric indicator of the type of activity accessed. For instance, for a particular type of objectionable Internet activity accessed a high numeric score may be assigned such as a number between 15 and 20. Likewise, a non-objectionable Internet access activity may be assigned a low number such as 0 or 1. An analysis program within the processing program 27 may analyze the Internet access activity and assign a score based on parameters such as key words and image content. Alternatively, instead of the default scoring system, the user or recipient may pre-select key words and/or other selected parameters to use for scoring purposes. In this scenario, a program will run for that particular user that assigns the score to the Internet access activity listed in accordance with the desired scoring for that user. For example, the user or recipient may select words to be given a high numeric score (i.e., words considered objectionable to that user or recipient), and words to be given a low numeric score. A variety of other scoring parameters may be included such as scoring based on the time of day (or night) the user engaged in Internet access activity, or the size of the file accessed by the user. Again, the score may be higher for activities logged late at night as opposed to during the day. As an alternative to the scenario described above, the numeric scoring may be replaced with a relative scoring system. Under this type of scoring method, for a particular activity a letter or other symbol may be used that designates whether the activity is deemed objectionable or not.

As shown in the schematic of FIG. 2, after the information has been processed, it may be transferred to second database 30 where it is stored in a file assigned to each user. Within second database 30, reports may be generated that sort and compile the stored information by a variety of parameters. Again, in the situation where only one database is utilized, the report may be generated within that one database. Alternatively, in the situation where no databases are utilized the report may be generated within the remote server itself. A typical report may include the date and time of access of each listed Internet access activity, the time period the user was engaged in the particular Internet access activity, the name of the Internet access activity (e.g., http name, ftp name, pop3 name), the numeric or relative score assigned to the activity, or any variety of other information that may be desired. The report may also be sorted by a variety of parameters, such as sorting by the score assigned to each Internet access activity listed in the report. For instance, it may be desirable to place the activities having the highest score values at the beginning of the report so the third party recipient may immediately review the more objectionable activities without searching through the report. Another feature of the report may include a comment section. The comment section may allow the user to type in a comment after engaging in a particular Internet access activity. For example, if the user conducted research for a school report, and visited a web site considered objectionable to the user, he may later access the report of that activity within remote server 26 and type in a comment explaining the visit to that site. The comment may then appear on the report to alert the third party recipient of the reason for the activity listed on the report.

The report generated by the monitoring system 20 may also be uniquely configured to contain a plurality of portions, with each portion containing different information related to the monitored Internet activity. For example, the report may include a first portion having information related to web site access activity (http activity). On this first portion, one or multiple links may be provided to allow the third party recipient or user to link from the first portion to another portion of the report. The other portions of the report may include a portion containing information on Internet access activity of the other Internet protocols being monitored. These other protocols may include those used by file sharing programs (gnutella, fast track), news groups (nntp), chat room activity, peer to peer chat activity, file transfer protocols (ftp), and e-mails read (such as pop3 or IMAP) and e-mails written (smtp). Thus, the report may contain a portion corresponding to each of the different protocols being monitored. Links may be included on each of the different portions to connect and link to the other portions. This configuration allows for efficient reporting of the Internet access activity and allows for separate reporting on the various protocols. Rather than having to search through one large report containing all of the information, the user or third party recipient may quickly and easily maneuver through the various portions of the report.

To retrieve reported information, remote server 26 may be accessed directly by the remote third party recipient through an Internet connection. As shown in FIG. 2, a report may be automatically sent to the third party recipient and/or user at predetermined time intervals. Alternatively, an electronic message (e.g., e-mail, facsimile) may be sent automatically to the third party recipient and/or user with a reminder to access remote server 26 to check the report. Thus, the third party recipient and/or user may receive reports and other information from remote server 26, or may access remote server 26 to view or request reports and other information. Another optional communication between remote server 26 and the third party recipient may include sending the recipient a notice that the user has deleted that third party from the recipient list. Since the system is designed for voluntary monitoring, the user may elect at any time to delete, add, or replace third party recipients.

While the invention has been described in conjunction with specific embodiments, it is evident that many alternatives, modifications and variations will be apparent to those skilled in the art in light of the foregoing description. Accordingly, the present invention attempts to embrace all such alternatives, modifications and variations that fall within the spirit and scope of the appended claims.

The invention claimed is:

1. A system for reporting the contents of Internet access from a selected computer, comprising:
a remote server;
a computer communicatively connected to said remote server having a monitoring program installed thereon, said monitoring program configured to monitor Internet access activity of the computer user, record said activity on said remote server, said Internet access activity includes access to at least one Internet protocol from the group consisting of hyper text transfer protocol, network news transfer protocol, file sharing programs, file transfer protocol, chat rooms, peer to peer chats, and electronic mail; and wherein said remote server is configured to generate a report of the Internet access activity of the computer user, and said report includes a plurality of portions, each of said plurality of portions contains a list of said recorded Internet access activity of one of said Internet protocols of the computer user, wherein said portions further include a computer link to connect to another portion of said report of the Internet access activity of the computer user, and wherein said report further includes a score assigned to each Internet access activity listed.

2. The system of claim 1, wherein said report is accessible by a third party recipient.

3. The system of claim 1, wherein said report displays said list of said recorded Internet access activity sorted by said score.

4. The system of claim 3, wherein said report displays said list of said recorded Internet access activity sorted chronologically.

5. The system of claim 1, wherein a first of the plurality of portions of the report represents web site access activity of the computer user and a second of the plurality of portions of the report represents e-mail access activity of the computer user, the first and second portions of the report being linked to each other.

6. The system of claim 1, wherein the report includes the Internet access activity of a selected computer user.

7. The system of claim 1, wherein the report is automatically sent to a third party recipient at predetermined time intervals.

* * * * *